United States Patent [19]

Bolton et al.

[11] Patent Number: 5,514,872
[45] Date of Patent: May 7, 1996

[54] HIGH GAS FLOW ALPHA DETECTOR

[75] Inventors: Richard D. Bolton; John A. Bounds; Mohini W. Rawool-Sullivan, all of Los Alamos, N.M.

[73] Assignee: The Regents of the University of California, Oakland, Calif.

[21] Appl. No.: 395,934

[22] Filed: Feb. 27, 1995

[51] Int. Cl.⁶ ..................................................... G01T 1/18
[52] U.S. Cl. .................. 250/380; 250/385.1; 250/DIG. 2
[58] Field of Search ...................... 250/380, 379, 250/374, 385.1, 382, 384, DIG. 2

[56] References Cited

U.S. PATENT DOCUMENTS

| 4,859,854 | 8/1989 | Kershner et al. | 250/374 |
| 5,053,624 | 10/1991 | Kronenberg | 250/374 |
| 5,059,803 | 10/1991 | Kronenberg | 250/374 |
| 5,194,734 | 3/1993 | MacArthur et al. | 250/382 |

FOREIGN PATENT DOCUMENTS 2835470  2/1980  Germany ................................. 250/380

*Primary Examiner*—Davis L. Willis
*Assistant Examiner*—Richard Hanig
*Attorney, Agent, or Firm*—Milton D. Wyrick; William A. Eklund

[57] ABSTRACT

An alpha detector for application in areas of high velocity gas flows, such as smokestacks and air vents. A plurality of spaced apart signal collectors are placed inside an enclosure, which would include smokestacks and air vents, in sufficient numbers to substantially span said enclosure so that gas ions generated within the gas flow are electrostatically captured by the signal collector means. Electrometer means and a voltage source are connected to the signal collectors to generate an electrical field between adjacent signal collectors, and to indicate a current produced through collection of the gas ions by the signal collectors.

24 Claims, 4 Drawing Sheets

HIGH GAS FLOW ALPHA DETECTOR

FIELD OF THE INVENTION

The present invention generally relates to the detection of alpha radiation, and, more specifically, to an alpha detector capable of detecting radiation in a high gas flow application. This invention was made with Government support under Contract No. W-7405-ENG-36 awarded by the U.S. Department of Energy. The Government has certain rights in the invention.

BACKGROUND OF THE INVENTION

In any area where radioactive materials are handled, it is imperative, both for the protection of personnel and to avoid contamination of the environment, to continuously monitor personnel, air vents, smoke stacks, surfaces, equipment, and clothing to prevent the release of radioactive contamination. Alpha contaminants, such as plutonium and uranium, are particularly difficult to detect because plutonium primarily emits alpha radiation, and alpha radiation has very limited penetration in air. Alpha particles from typical contaminants travel only a few inches in air. It is because of this characteristic that prior alpha detectors have been useful only when used in close proximity to the point of possible radioactive emission.

In the past, several instrument designs have been utilized to detect alpha radiation. Among these are GM tubes, ionization chambers, count rate detectors, and scintillation or gas flow proportional probes. While these instruments are capable of detecting alpha particles, they do so by directly detecting incident radiation, and must be within an inch of the source of the radiation. Also, these conventional alpha particle detectors can only scan an area approximately equal to the size of the detector, and are of little value in detecting radiation in a high gas flow situation.

As used herein, the terms "long range," or "long distance," when referring to the detection capabilities of the present invention, shall mean detection from a range or distance of more than one (1) inch from the source of alpha radiation.

The primary reason for an alpha particle's short flight path in gas is its collision with air or other gas molecules. In almost all of these collisions, various of the molecular species in air or a gas are ionized. These ions, referred to herein as "gas ions," have a sufficiently long lifetime that they may be transported by mass flow of the surrounding air, or by the direct attraction of an electric field, and detected at distances much greater than the penetration distances of the original alpha particles. That is, the gas ions thus created have a longer life and area of influence than the alpha particles that created them. These are the ions that are detected by the present invention. The fact that the gas ions have a longer range than the alpha particles relieves the necessity for having a detector moved in close proximity over a person or equipment in order to detect the presence of alpha radiation.

The present invention provides an alpha monitor for use with high gas flows. It is based on technology which is contained in several U.S. Patents which disclose various devices for the long range detection of alpha particles. The first is U.S. Pat. No. 5,184,019, issued Feb. 2, 1993, for a Long Range Alpha Particle Detector. The second is U.S. Pat. No. 5,194,737, issued Mar. 16, 1993, for Single and Double Grid Long Range Alpha Detectors. The third is U.S. Pat. No. 5,187,370, issued Feb. 16, 1993, for Alternating Current Long Range Alpha Particle Detectors. The fourth is U.S. Pat. No. 5,281,824, issued Jan. 25, 1994, for Radon Detection. The fifth is U.S. Pat. No. 5,311,025, issued May 10, 1994, for Fan-less Long Range Alpha Detector. Another recently filed application bears Ser. No. 08/833020, filed Nov. 1, 1994, and is entitled "Event Counting Alpha Detector." Still another recently filed application bears Ser. No. 08/382,333, filed Feb. 1, 1995, and is entitled "Background Canceling Surface Alpha Detector." As previously described, the principle underlying each of these patents and patent applications is that alpha particles, although themselves of very short range in air, ionize various of the molecular species in air. The present invention modifies this apparatus to provide for reliable detection of alpha radiation from high gas flows, such as through an air vent or a smokestack.

The fact that long range alpha detectors, as described in the above-referenced patents and application, can detect alpha radiation at a considerable distance from its point of emanation allows for monitoring of contamination in several areas which are extremely difficult or even impossible for current detectors. However, these previous detectors would lose many ions if the gas flow velocity exceeds a certain level. The current invention is able to overcome this problem through the use of multiple signal collectors positioned parallel to the gas flow, the collectors being of alternating polarity.

It is therefore an object of the present invention to provide apparatus capable of the detection of alpha radiation in a high flow of air or other gas.

It is another object of the present invention to detect gas ions created by collision with alpha particles of both positive and negative polarities.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the present invention, there is provided an alpha detector for detecting alpha radiation in a high volume flow of gas comprising an enclosure defining openings at two ends with an odd-numbered plurality of spaced apart signal collectors insulatively mounted in the enclosure and defining first and last signal collectors. The odd-numbered plurality of spaced apart signal collectors are arranged parallel to the high volume flow of gas through the openings and comprise sufficient numbers to substantially span the enclosure so that gas ions generated within the flow of gas are electrostatically captured by the odd-numbered plurality of spaced apart signal collectors. Electrometer means are connected between the first and last signal collectors and alternating signal collectors therebetween of the odd-numbered plurality of spaced apart signal collectors and ground for measuring the flow of electrical current between adjacent signal collectors generated by the capture of the gas ions. A voltage source is connected between ground and signal planes of the odd-numbered plurality of spaced apart signal collectors not connected to the electrometer means for generating an electric field between the adjacent signal collectors. Wherein gas ions created through collision of gas molecules with alpha particles will be attracted to the plurality of spaced apart signal collectors and produce a signal in the electrometer.

In another aspect of the present invention there is provided an alpha detector for detecting alpha radiation in a high volume flow of gas comprising an enclosure defining openings at two ends with an odd-numbered plurality of spaced apart signal collectors insulatively mounted in the enclosure and defining first and last signal collectors. The odd-numbered plurality of spaced apart signal collectors are arranged parallel to the high volume flow of gas through the openings and comprises sufficient numbers to substantially span the enclosure so that gas ions generated within flow of gas are electrostatically captured by the odd-numbered plurality of spaced apart signal collectors. A voltage source is connected to the first and last signal collectors and to alternating signal collectors therebetween of the plurality of spaced apart signal collectors for generating an electric field between the adjacent signal collectors. Electrometer means are connected to the voltage source and to signal planes of the plurality of spaced apart signal collectors not connected to the voltage source for measuring a flow of electrical current between adjacent signal collectors generated by the capture of the gas ions. Wherein the gas ions created through collision of gas molecules with alpha particles will be attracted to one of the plurality of spaced apart signal collectors and produce a signal in the electrometer.

BRIEF DESCRIPTION OF THE DRAWINGS

The accompanying drawings, which are incorporated in and form a part of the specification, illustrate the embodiment(s) of the present invention and, together with the description, serve to explain the principles of the invention. In the drawings.

DETAILED DESCRIPTION

The present invention provides apparatus for the detection of alpha radiation in a large volume flow of gas such as through air vents and smokestacks. It accomplishes this through the use of an odd number of multiple signal collectors arranged parallel to one another and to the flow of gas. The invention can be best understood through reference to the drawings.

Figure 1:
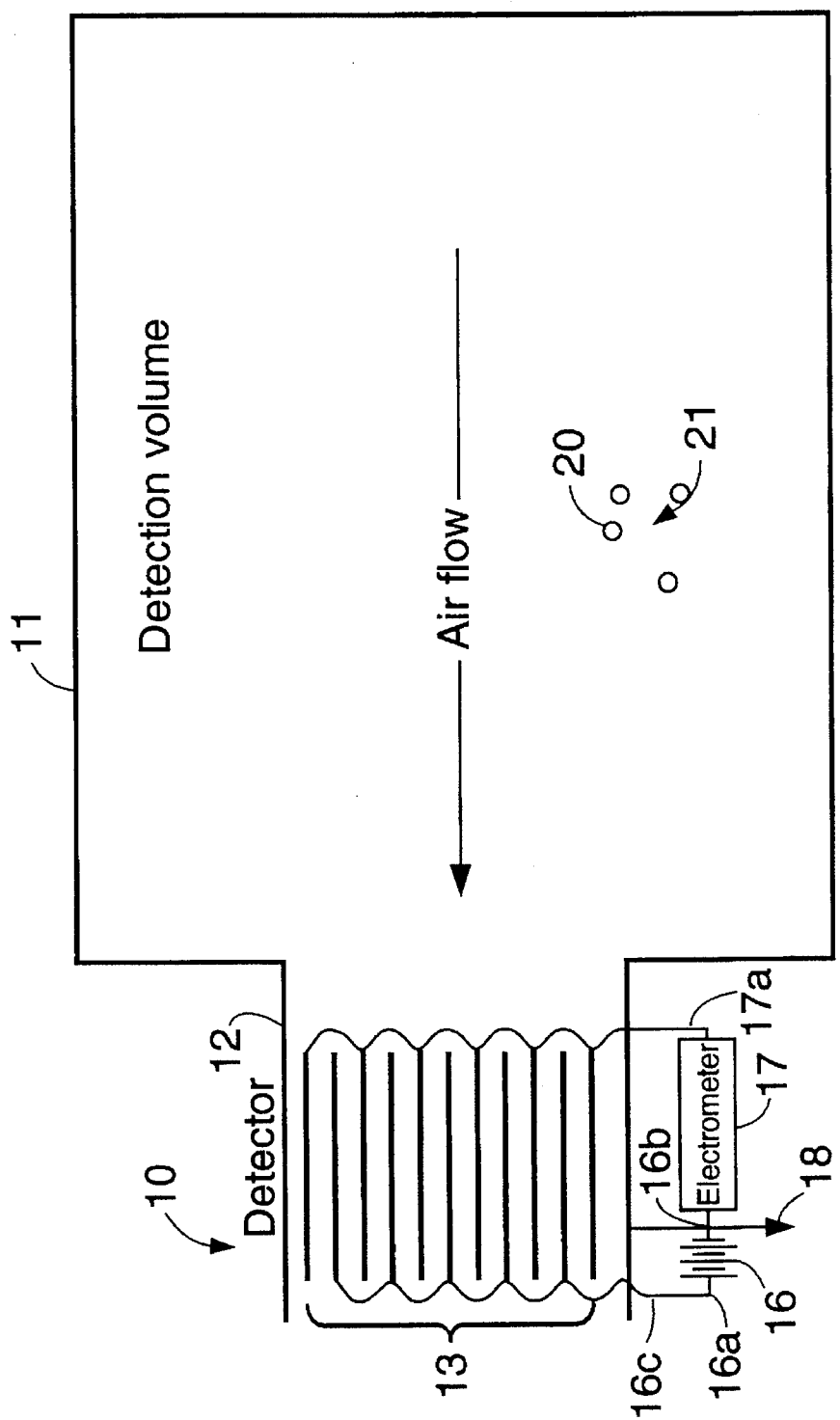
FIG. 1 is a schematical cross-sectional side view of one embodiment of the present invention in which eleven (11) signal collectors are mounted inside an enclosure which is open to a detection volume with the signal collectors grounded through an electrometer.

Turning now to FIG. 1, there can be seen a cross-sectional view of one embodiment of the present invention in which detector 10 is shown connected to detection volume 11. It should be understood that although detector 10 is illustrated as having a smaller diameter than detection volume 11, this does not limit the size of detector 10 in relation to the size of a detection volume 11. Detection volume 11 is merely representative of any application to which detector 10 is applied, such as the ducting of an air vent, or the lower section of a smokestack.

As shown detector 10 includes an enclosure 12 in which an odd-numbered plurality of signal collectors 13 are insulatively mounted to one another and to enclosure 12. Use of the term "odd-numbered" plurality refers to any odd number of signal collectors 13 greater than one. Signal collectors 13 are arranged so that they are parallel both to one another and to the high volume flow of gas, and substantially span enclosure 12.

Signal collectors 13 can comprise any convenient electrically conductive material. For normal conditions, copper or aluminum could be used. Aluminum may be preferred because of its lighter weight. For more severe applications, such as in a corrosive environment, stainless steel could be used. In high temperature applications, tungsten could be used. Each signal collector 13 is spaced apart from its adjacent signal collectors 13 by a distance related to the expected gas flow speed. For many applications, a spacing distance of approximately 1.5 cm will be appropriate.

As signal collectors 13 are to collect gas ions 20 created in detector volume 11 by collisions of gas molecules with alpha radiation 21, electrometer 17 passes insulatively through enclosure 12 and is connected to the first and last signal collectors 13 which, in this embodiment, are adjacent to enclosure 12, and to alternating signal collectors 13 therebetween. Positive post 16a insulatively passes through enclosure 12 and is connected to the individual signal planes 13 which are not connected to electrometer 17, by way of conductor 17a. Negative post 16b of voltage source 16 is connected to electrometer 17 as well as to ground through electrical ground connection 18, which also grounds enclosure 12. By the use of an odd-numbered plurality of signal collectors 13, the present embodiment of the invention detects the current between the outer signal planes 13 and ground.

Figure 2:
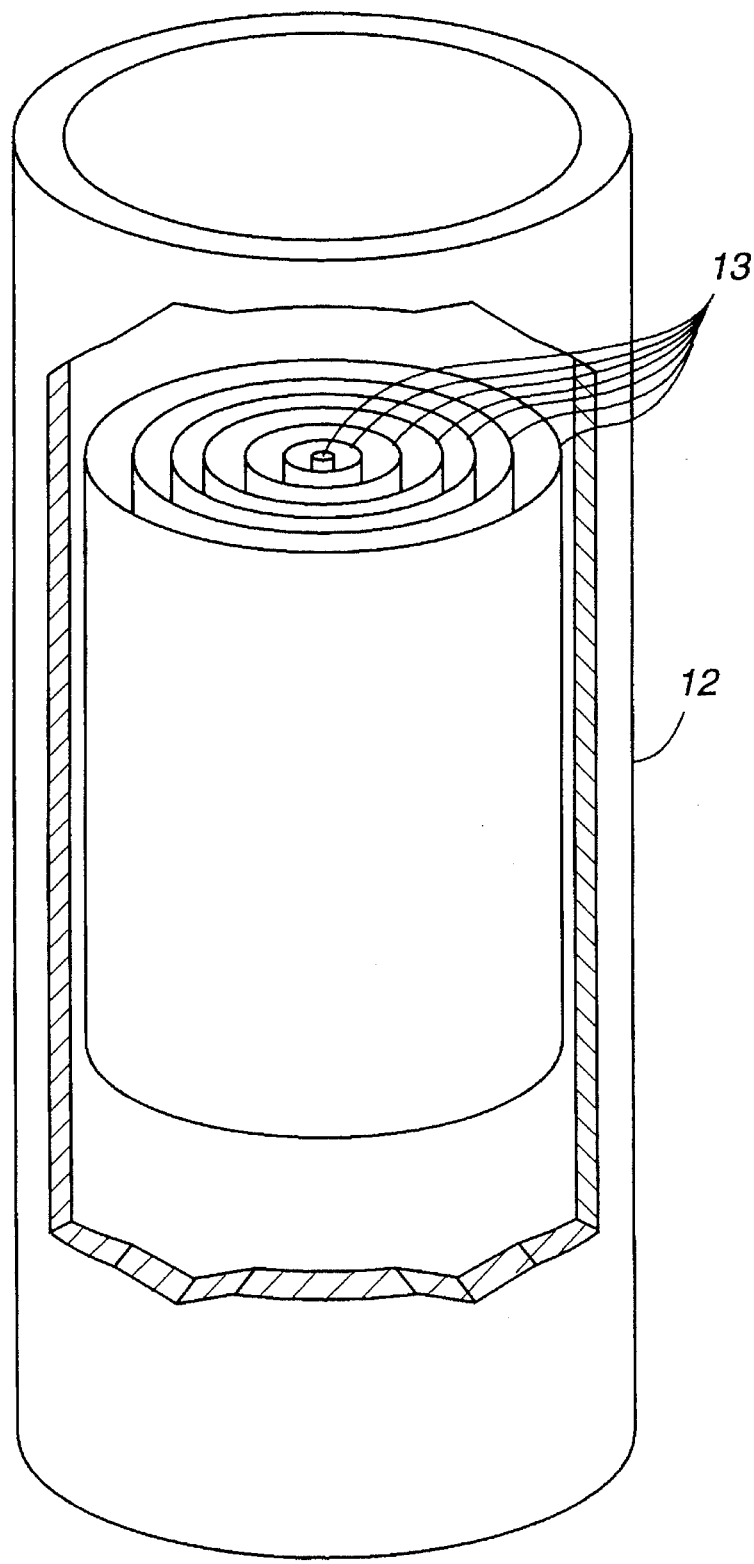
FIG. 2 is a cutaway perspective view of an embodiment of the present invention employing cylindrical signal collectors for use in cylindrical applications such as smokestacks.

Signal collectors 13, for many applications can be planar as illustrated in FIG. 1. This would be preferred for square or rectangular applications, such as in air ducts. However, it may be advantageous in smokestack or other applications for signal collectors 13 to be cylindrically shaped. Such an embodiment is illustrated in FIG. 2, in which signal collectors 13 are shown inside a cylindrical enclosure 12. The wiring to the individual signal collectors 13 is omitted for clarity. The wiring of this embodiment is similar to that for planar signal collectors 13, except that the first and last signal collectors 13 are now the outer signal collector 13, and the innermost signal collector 13, respectively. The electric field for capturing ions now exists between adjacent cylindrical signal collectors 13, and between the first signal collector 13 and enclosure 12.

Enclosure 12 is preferably an electrically conductive enclosure. However, depending on the application, enclosure 12 need not necessarily be made of a conductor. The invention, for example, might be used in brick smokestacks, or in plastic duct work of some type. In this type of application, the invention might be more noisy, but would still render satisfactory output.

In these embodiments, with alternating signal collectors 13 being at the same electrical potential, an electrical field is established between adjacent signal collectors 13. Alpha decays in the gas contained in detection volume 11 will produce gas ions 20. These gas ions 20 will be transported to detector 10 and therefore to signal collectors 13, and will be attracted to either high or low polarity signal collectors 13, depending on the polarity of gas ions 20, due to the electrostatic field between adjacent signal collectors 13. The collection of gas ions 20 by signal collectors 13 produces a current in electrometer 17.

The increased ion collection area of signal collectors 13, resulting from the multiple electrostatic fields between adjacent signal collectors 13, enables detector 10 to collect a reasonable percentage of all of the gas ions 20 created in detection volume 11 even in the case of high gas flow rates. Of course, with enclosure 12 grounded along with negative post 16b, no electric field will exist between the outer signal collectors 13 and enclosure 12. Because of this, a relatively small number of ions may pass through this volume undetected.

Signal collectors 13 are insulated from each other and insulatively mounted to enclosure 12 using insulators (not shown), which must be made of a high bulk resistivity material such as LEXAN® or TEFLON®. The main requirements for the insulators are that they be capable of insulating signal collectors 13 from one another and from enclosure 12, and that they provide the necessary structural integrity to signal collectors 13.

Voltage source 16 need supply an electrostatic field of typically 10 to 200 V/cm between adjacent signal collectors 13 for proper operation of detector 10. When detector 10 is used in remote operations, it may be convenient if voltage source 16 is a battery. In many other applications, as well, use of a battery or other direct current source may be preferred.

In operation, detector 10 is placed in the flow of air or other gas to be monitored for alpha radiation. This may involve placing detector 10 into a smokestack or ducting of an air vent. Using a direct current voltage source 16, gas ions 20 created by collisions of air or other gas molecules with the short range alpha particles 21 in the air or other gas passing through detector 10 are attracted to signal collectors 13, and to the walls of enclosure 12, depending on their polarity, because of the electric field established between adjacent signal collectors 13.

Figure 3:
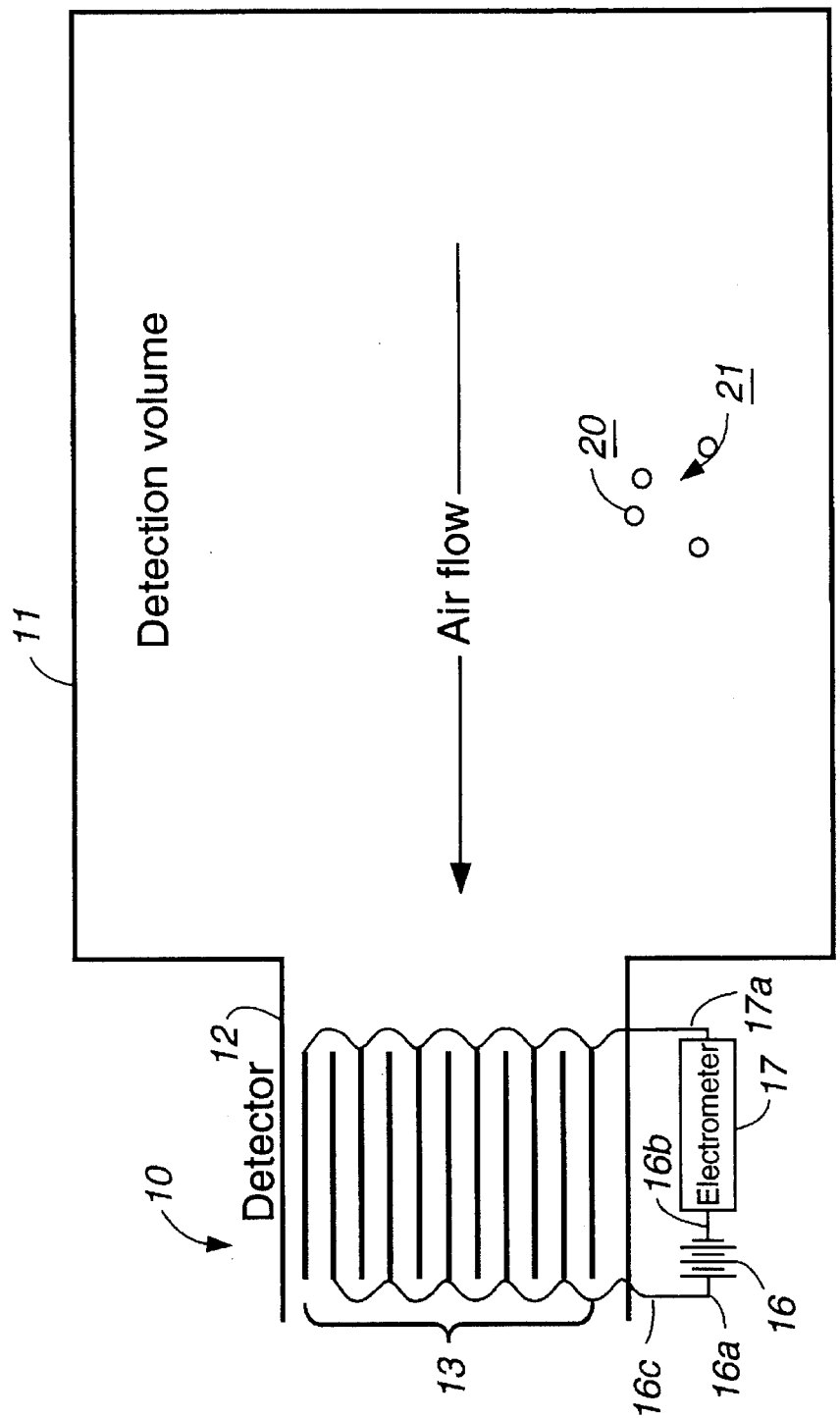
FIG. 3 is a schematical cross-sectional side view of one embodiment of the present invention in which eleven (11) signal collectors are mounted inside an enclosure which is open to a detection volume with the signal collectors floating ungrounded.

In another embodiment of the present invention, a different wiring arrangement is employed. In FIG. 3 it can be seen that in this embodiment voltage source 16 has its positive post 16a connected to the signal collectors 13 which are adjacent to enclosure 12, and to alternating signal collectors 13 therebetween. Electrometer 17 is connected between the individual signal collectors 13 not connected to voltage source 16 and negative post 16b of voltage source 16. In this embodiment, enclosure 12 and negative post 16b are not grounded. This allows for collection of both positive and negative gas ions 20, improving the sensitivity of detector 10.

Figure 4:
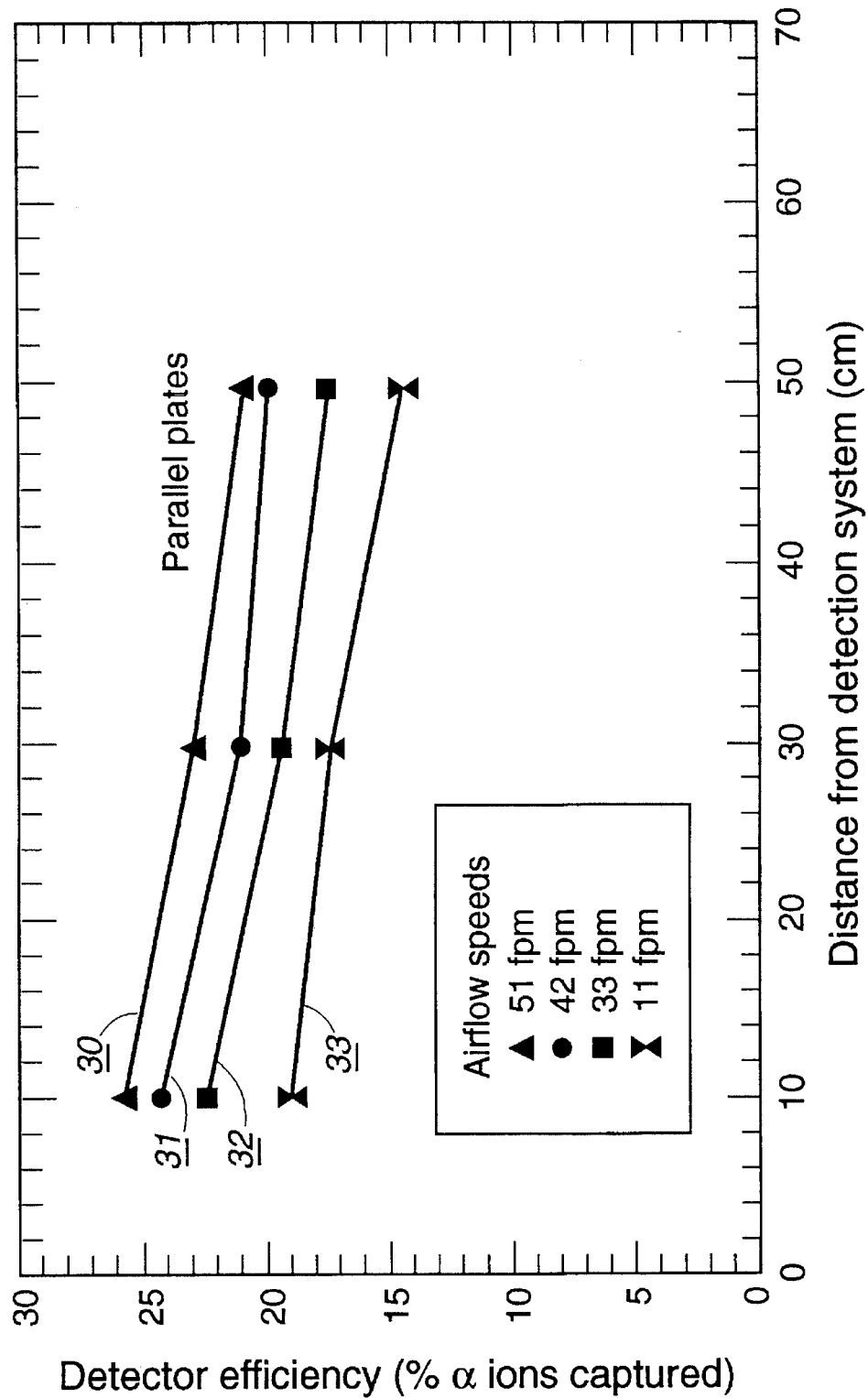
FIG. 4 is a graph illustrating the sensitivity of one of the embodiments of the present invention to a flow of air over a radioactive source.

In a test of this embodiment, signal collectors 13 were 8 cm by 48 cm copper plates, separated from one another by a distance of 1.5 cm. Voltage source 16 supplied 45 V between adjacent signal collectors 13. Insulators were used to isolate signal collectors 13 from enclosure 12, which was electrically conductive, and were made of LEXAN®. A $2.2 \times 10^5$ dpm $^{238}$PU source was placed at locations of 10 cm, 30 cm and 50 cm from the edges of signal collectors 13. The percentage of gas ions 20 captured by detector 10, a measure of the efficiency of detector 10, was obtained by dividing the current measured by electrometer 17 by the theoretical current expected from the radioactive source. The results are illustrated in FIG. 4, with "Detector Efficiency" plotted versus the distance of the radioactive source from signal collectors 13. Plot 30 represents the sensitivity at an airlow speed of 51 fpm; plot 31 represents the sensitivity at an airflow speed of 42 fpm; plot 32 represents the sensitivity at an airflow speed of 33 fpm; and plot 33 represents the sensitivity at an airflow speed of 11 fpm. As expected, the higher airflow speeds in this test produced the higher efficiencies. This is because more ions can reach signal collectors 13 before recombining. It should be noted that at an extremely high gas speed gas ions 20 could be transported through signal collectors 13 without being collected by signal collectors 13.

The foregoing description of the embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An alpha detector for detecting alpha radiation in a high volume flow of gas comprising:

an enclosure defining openings at two ends;

an odd-numbered plurality of spaced apart signal collectors insulatively mounted in said enclosure defining first and last signal collectors, said odd-numbered plurality of spaced apart signal collectors being arranged parallel to said high volume flow of gas through said openings and comprising sufficient numbers to substantially span said enclosure so that gas ions generated within said gas flow are electrostatically captured by said odd-numbered plurality of spaced apart signal collectors;

electrometer means connected between said first and last signal collectors and alternating signal collectors therebetween of said odd-numbered plurality of spaced apart signal collectors and ground for measuring a flow of electrical current between adjacent signal collectors generated by said capture of said gas ions; and a voltage source connected between ground and said signal planes of said odd-numbered plurality of spaced apart signal collectors not connected to said electrometer means for generating an electric field between said adjacent signal collectors;

wherein gas ions created through collision of gas molecules with alpha particles will be attracted to said plurality of spaced apart signal collectors and produce a signal in said electrometer.

2. The alpha detector as described in claim 1, wherein said plurality of spaced apart signal collectors are planar and are parallel to adjacent signal collectors of said plurality of spaced apart signal collectors.

3. The alpha detector as described in claim 1, wherein said plurality of spaced apart signal collectors are concentric cylinders.

4. The alpha detector as described in claim 1, wherein said enclosure comprises an electrically conductive material.

5. The alpha detector as described in claim 1, wherein said enclosure comprises a smokestack.

6. The alpha detector as described in claim 1, wherein said enclosure comprises ductwork associated with an air vent.

7. The alpha detector as described in claim 1, wherein said voltage source comprises a direct current source providing an electrostatic field of 10 to 200 V/cm between said adjacent signal collectors.

8. The alpha detector as described in claim 1, wherein said plurality of spaced apart signal collectors comprise an electrically conductive material.

9. The alpha detector as described in claim 8, wherein said electrically conductive material comprises copper.

10. The alpha detector as described in claim 8, wherein said electrically conductive material comprises aluminum.

11. The alpha detector as described in claim 8, wherein said electrically conductive material comprises stainless steel.

12. The alpha detector as described in claim 8, wherein said electrically conductive material comprises tungsten.

13. An alpha detector for detecting alpha radiation in a high volume flow of gas comprising:

an enclosure defining openings at two ends;

an odd-numbered plurality of spaced apart signal collectors insulatively mounted in said enclosure defining first and last signal collectors, said odd-numbered plurality of spaced apart signal collectors being arranged parallel to said high volume flow of gas through said openings and comprising sufficient numbers to substantially span said enclosure so that gas ions generated within said gas flow are electrostatically captured by said odd-numbered plurality of spaced apart signal collectors;

a voltage source connected to said first and last signal collectors and to alternating signal collectors therebetween of said plurality of spaced apart signal collectors for generating an electric field between adjacent signal collectors;

electrometer means connected to said electrical source and to signal planes of said plurality of spaced apart signal collectors not connected to said electical source for measuring the flow of electrical current between said adjacent signal collectors generated by capture of said gas ions; and wherein gas ions created through collision of an gas molecules with alpha particles will be attracted to one of said plurality of spaced apart signal collectors and produce a signal in said electrometer.

14. The alpha detector as described in claim 13, wherein said plurality of signal collectors are planar and parallel with adjacent signal collectors of said plurality of spaced apart signal collectors.

15. The alpha detector as described in claim 13, wherein said plurality of signal collectors are concentric cylinders.

16. The alpha detector as described in claim 13, wherein said enclosure comprises an electrically conductive material.

17. The alpha detector as described in claim 13, wherein said enclosure comprises a smokestack.

18. The alpha detector as described in claim 13, wherein said enclosure comprises ductwork associated with an air vent.

19. The alpha detector as described in claim 13, wherein said voltage source comprises a direct current source providing an electrostatic field of 10 to 200 V/cm between said adjacent signal collectors.

20. The alpha detector as described in claim 14, wherein said plurality of spaced apart signal collectors comprise an electrically conductive material.

21. The alpha detector as described in claim 20, wherein said electrically conductive material comprises copper.

22. The alpha detector as described in claim 20, wherein said electrically conductive material comprises aluminum.

23. The alpha detector as described in claim 20, wherein said electrically conductive material comprises stainless steel.

24. The alpha detector as described in claim 20, wherein said electrically conductive material comprises tungsten.

* * * * *